United States Patent [19]

Wyman

[11] 4,127,166

[45] Nov. 28, 1978

[54] NON-PNEUMATIC BICYCLE TIRE

[76] Inventor: Ransome J. Wyman, 4676 Admiralty Way, Marina del Rey, Calif. 90291

[21] Appl. No.: 754,595

[22] Filed: Dec. 27, 1976

[51] Int. Cl.² ............................................. B60C 7/00
[52] U.S. Cl. .................................... 152/323; 152/312
[58] Field of Search ............................. 152/323–325, 152/327, 329, 339, 310–312, 357 A, 362 R

[56] References Cited

U.S. PATENT DOCUMENTS

| | | | |
|---|---|---|---|
| 506,424 | 10/1893 | Ducasble | 152/327 |
| 2,393,161 | 1/1946 | Haushalter | 152/325 |
| 3,114,408 | 12/1963 | Ross | 152/323 |
| 3,980,606 | 9/1976 | Werner | 152/357 A |
| 4,015,652 | 4/1977 | Harris | 152/362 R |
| 4,033,395 | 7/1977 | Berg et al. | 152/323 |

FOREIGN PATENT DOCUMENTS 2,249,172  4/1973  Fed. Rep. of Germany ...... 152/357 A

*Primary Examiner*—Albert J. Makay
*Assistant Examiner*—Carl Rowold
*Attorney, Agent, or Firm*—Herbert E. Kidder

[57] ABSTRACT

A solid, monolithic bicycle tire made of urethane rubber with a cured hardness of from 50 to 95 Durometer A. The tire is formed with a pair of laterally spaced bead shoulders that seat on the bead seats of the wheel rim, and has a circumferential, arch-shaped tunnel formed in the inner side of the tire between the bead shoulders. The tunnel co-operates with the channel in the bottom of the wheel rim to form an annular void, or air space, that allows the tire to collapse locally under excessive impact loads, and at the same time provides a space into which the solid urethane elastomer can be displaced under compression. Under normal riding conditions, most of the light shock loads experienced when riding on a relatively smooth road surface are absorbed by the resiliency of the urethane rubber, with only a minor amount of deflection of the arched tunnel. A severe impact causes the tunnel to collapse to a greater extent, thereby absorbing the shock load and preventing damage to the wheel rim. The tire is cast in a mold, using liquid urethane resin catalyzed to cure in 3 to 5 minutes at room temperatures (i.e., 80° to 100° F).

1 Claim, 3 Drawing Figures

NON-PNEUMATIC BICYCLE TIRE

BACKGROUND OF THE INVENTION

The present invention pertains generally to vehicle tires, and more particularly to a new and improved form of tire of the type used primarily on bicycles, wheel chairs, and the like.

Heretofore, the only type of bicycle tire available on the market has been the pneumatic tire, which is constructed much like an automobile tire, with a cord carcass and steel wire beads. Most bicycle tires are of the tube type, and generally, two types of tubes are available; the relatively thin, regular tube, and the considerably heavier, so-called thorn-proof tube.

These pneumatic bicycle tires have a number of disadvantages. They are subject to blow-outs, which cause serious safety hazards. Because of the thin tread, they wear out quickly and have a relatively short service life. Also, as a result of the thin tread, they are readily punctured by thorns and/or small pieces of glass or nails. They lose air and become under-inflated, and as a result they become extremely difficult to ride. It is necessary to carry a tire pump to keep the tires properly inflated, or else make frequent trips to service stations to inflate the tires with their compressed air. The tires are easily cut, and cannot be repaired. They are expensive to manufacture because of the fact that a considerable amount of skilled labor and expensive tooling is required to make the tire. And finally, they do not contribute to the visibility of the bicycle, except when reflective strips are cemented to the side walls of the tires.

There have been attempts to overcome some of the above disadvantages by filling the tires with a mixture of two liquid urethane resins, which react, or cure, to form a solid, resilient elastomeric tire. Such elastomeric tire fillings have been used successfully in automobile tires for a number of years, and two examples of this material are Permatire, made by Arnco, of Marina del Rey, California, and TireFill, made by Indpol, of Cucamonga, California. While bicycle tires filled solidly with urethane rubber eliminate some of the disadvantages of pneumatic tires, such as blow-outs, slow leaks, and underinflation, they have a number of disadvantages of their own. One serious disadvantage is that the urethane-filled tire is extremely heavy, weighing up to 5 or 6 pounds per tire, which makes a total weight penalty of 10 to 12 pounds for the bicycle. This is because it takes from 3 to 4 pounds of urethane rubber to fill the tire. Another disadvantage is that the ride is harder, and rolling resistance is increased. Ride comfort and rolling resistance are mutually antagonistic quantities, and it is necessary to make a compromise between them, which usually results in a fairly hard ride with a moderate amount of rolling resistance.

A more serious problem with filled tires is that they cannot be removed from the wheel rims for spoke repairs or adjustment, without damaging the tire. This is because the tire is filled all the way to the full depth of the rim, which greatly reduces the minimum diameter that has to be pulled over the rim of the wheel. As a result, the only way the tire can be removed is by cutting it, and this destroys the tire.

Another major problem with filled bicycle tires is that wheel rims are easily damaged on sharp impact, due to the incompresssibility of the fill material, which extends directly to the rim. The solid fill material has no place to go, and therefore a sharp impact blow against the tire causes a highly concentrated stress to be applied directly to the rim, causing damage.

The tire filling process is slow, difficult, expensive and unreliable when applied to bicycle tires. It requires equipment to handle liquid urethanes and operators well-trained in handling the polymers to do this filling job right. Bike shops are not set up to do such jobs, and most of them would decline to go into the tire-filling business because of the many problems and relatively small volume of business.

Finally, large cuts cannot be repaired effectively, because the fill material has low physical properties and damages easily when the tire surface is cut.

SUMMARY OF THE INVENTION

The primary object of the present invention is to provide a bicycle tire which overcomes all of the disadvantages of pneumatic bicycle tires as well as the disadvantages of filled bicycle tires. To this end, the present invention provides a solid, monolithic construction made from a suitable urethane elastomer, of approximately 50 to 95 Durometer A, with no tire bead or fabric reinforcement. The tire of the present invention contains a novel, arch-shaped tunnel that allows sidewall support without internal air pressure, and helps reduce overall weight. The tire of the present invention has ribbed sidewalls that allow a suitably thick adhesive bead for properly bonding the tire to the rim, plus adjustability to accommodate dimensional variations in rims. A flexible adhesive is used to help distribute extreme loads from sharp impacts. The tire features a universal shoulder that provides for accurate tire seating on a large variety of available rim configurations, and the tire diameter is mounted somewhat under-size to provide tension on the rim for automatic proper positioning while the tire adhesive is setting.

The advantageous features of the invention are many. There is no possibility of blow-outs, flats, or underinflation. The tire has an excellent ride quality, comparable to high pressure pneumatic tires, and rolling resistance is equal to properly inflated pneumatic tires. The tire can be easily repaired with silicone bathtub caulk or suitable adhesive if it becomes cut. The adhesive merely holds the cut edges together and prevents the cut from propagating further. No other cut tire can be repaired so easily.

One highly desirable feature of the invention is that a thick usable wear surface for extended tire wear is provided. Since the tire is solid for a considerable depth, all of the full depth of the material on the outer surface can be utilized for wear purposes. The tire can be pigmented easily with Day-Glo pigments for improved bicycle visibility for safety. While the tire is somewhat heavier than conventional pneumatic tires (e.g., 2.0 lbs. vs about 1.4 lbs. for a 1×27 tire), it is about the same weight as a 27-inch × 1.25 tire with a thorn-proof tube, and considerably less in weight than a urethane-filled tire, which weighs up to 5 or 6 pounds. Also, since it is no longer necessary to carry a tire pump, extra tubes, and repair kits, the total weight of the bicycle and its rider is approximately the same as a bicycle equipped with pneumatic tires.

One important advantage of the tire of the present invention is that it can easily be removed for spoke adjustment and repair, then rebonded to the rim. The tire is elastic, and can be stretched out over the edge of the wheel rim without damage. The bonding cement is one that gives way easily. Rim damage is no greater than with conventional bicycle tires, because of the tunnel shape of the tire, which leaves a large void inside the tire that can be partially collapsed under severe impact loads. The tire requires no tube, since support is solely from the elastomer and the unique arched tunnel. The tire is also easily handled and installed without tools, and there is no need for a pump or compressed air supply.

Finally, the tire is easily manufactured with a minimum of labor, using liquid, room-temperature-curing elastomers. Automatic machinery can be used to make the tires, as there is no hand lay-up required. The room-temperature cure material requires little or no energy, and the tire can come out of the mold in as little as 3 to 5 minutes.

These and other objects and advantages of the present invention will become apparent to those skilled in the art from the following detailed description of the preferred embodiment thereof, with reference to the accompanying drawings.

DESCRIPTION OF THE PREFERRED EMBODIMENT

Figure 1:
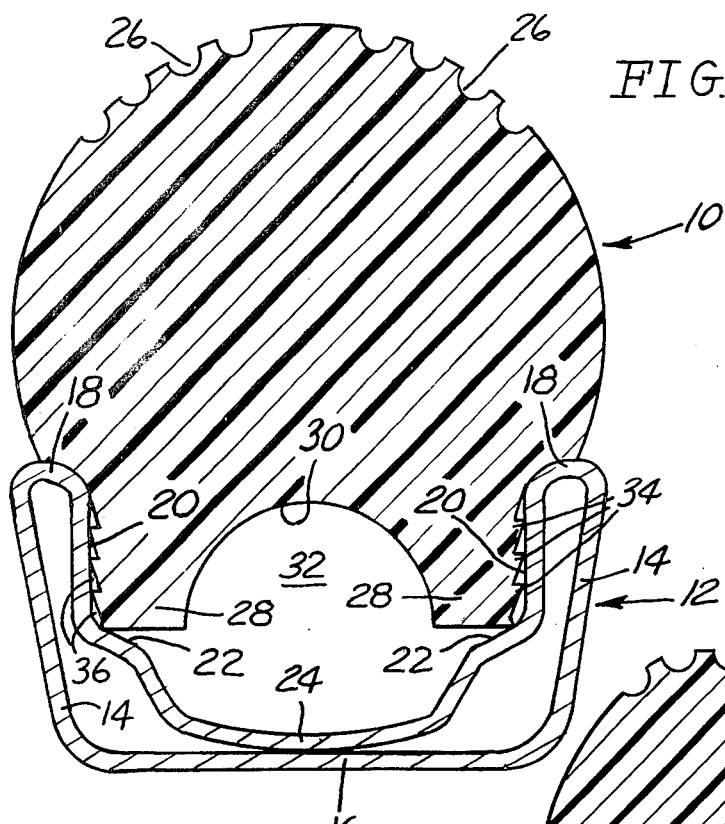
FIG. 1 is a cross-sectional view of a bicycle tire embodying the invention, showing the tire mounted on a conventional wheel rim.
Figure 2:
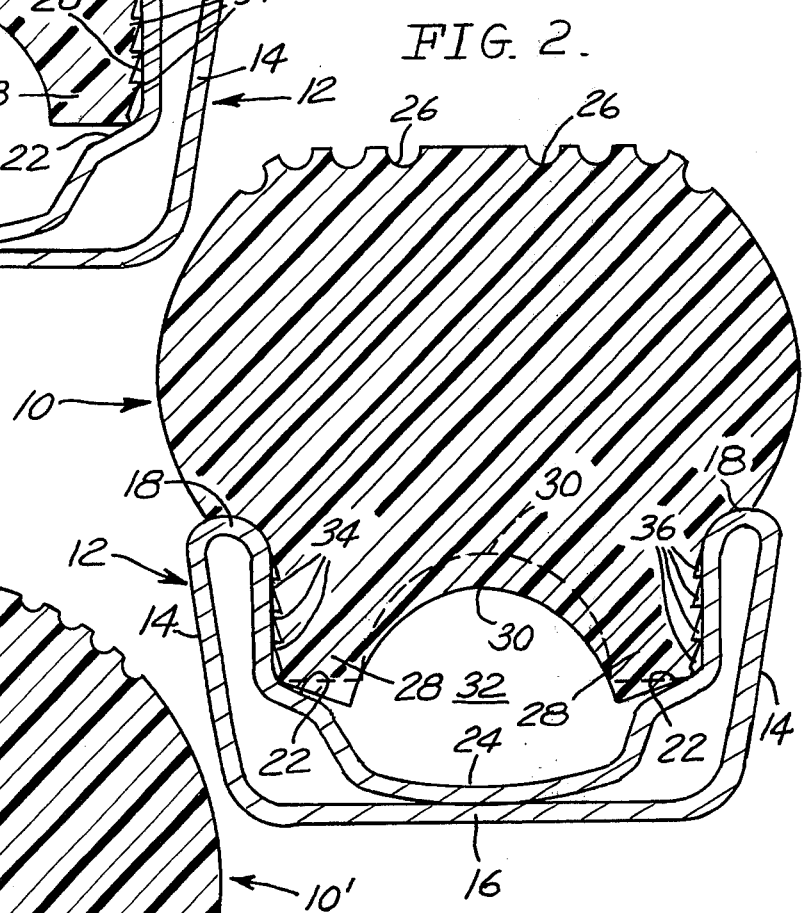
FIG. 2 is another view of the same, showing the tire compressed under load.

In the drawings, FIGS. 1 and 2 show a first embodiment of the invention, which will now be described. A tire embodying the invention is designated in its entirety by the reference numeral 10, and is shown mounted on a bicycle wheel rim 12. The wheel rim 12 is conventional, and is usually made of sheet metal, roll-formed to the configuration shown in the drawings. The outer skin of the wheel rim forms flanks 14 which merge into a crown 16 that forms the inside periphery of the wheel. At the outer edges, the flanks 14 are rolled inwardly at 18 to form the outer side walls 20 of bead seats 22. Between the two laterally spaced bead seats 22 is a shallow channel 24, which forms the bottom of the wheel rim on the outside thereof.

The tire 10 is a solid, monolithic casting of urethane rubber, with a cured hardness of 50 to 95 Durometer A. The tire body is made by pouring liquid urethane resin into a mold, said resin being catalyzed to cure in 3 to 5 minutes at room temperature (i.e., from 80° to 100° F.), after which the tire is removed from the mold as a finished product, with no further processing being required.

The outer part of the tire body is substantially circular in cross-section, as shown in FIG. 1, with a tread pattern 26 on the outer surface thereof. On the inner side of the tire body, opposite tread pattern 26, are two laterally spaced bead shoulders 28, that seat on the bead seats 22 of the wheel rim. Between the bead shoulders 28 is an arch-shaped tunnel 30, which cooperates with the channel 24 of the tire rim to form a void, or air space 32, which allows the tire body to collapse locally under excessive impact loads, as shown in FIG. 2, so as to cushion the blow.

FIG. 2 shows the tire, as it might be deformed under a severe impact load. It will be noted that the tunnel 30 has partially collapsed under the impact, the original position of the tunnel being shown in dashed lines and the solid lines representing the tunnel as deformed by the impact. At the same time, the bead shoulders 28 have been bent downwardly and outwardly, and show a certain amount of compression. The tread 26 is flattened by the pavement, and the sides of the tire body are bulged out as the resilient urethane rubber is compressed. Under normal riding conditions, most of the load on the tire is carried by the bead shoulders 28, which transmit the load directly to the wheel rim. This load is carried without internal air pressure as in conventional pneumatic tires, and under normal riding conditions most of the light shock loads experienced when riding on a relatively smooth road surface are absorbed by the resiliency of the urethane rubber, with only a minor amount of deflection of the arched tunnel 30. However, it is severe impact loads that cause damage to wheel rims, and these are cushioned by the tunnel 30, which enables the tire body to deflect a great deal more than is possible with solidly filled tires.

The outer walls of the bead shoulders 28 have three narrow, radially spaced ridges 34 provided thereon, which extend circumferentially around the tire. These ridges are adapted to contact the outer side walls 20 of the tire rim, and they cooperate with the same to define annular spaces between the bead seat outer side walls and the bead shoulder wall that are to receive liquid adhesive cement so as to form cement beads 36 of a predetermined thickness. The ridges 34 thus serve to prevent the cement from squeezing out. Another advantageous feature of this is that the thicker adhesive bead 36 allows for a greater amount of stretch of the cement before it yields, and in the process of stretching it spreads the load over a wider area. As a result, a low bonding strength adhesive can be used, which still exhibits an adequate over-all bonding strength for bonding the tire to the rim. The cement may be applied after the tire has been mounted on the rim by merely pressing the sides of the tire inwardly to open up a slight gap between the bead shoulder 28 and the outer side walls 20 of the tire rim, and squeezing a liquid cement from a tube into the space, repeating the process all the way around the tire, on both sides thereof.

Figure 3:
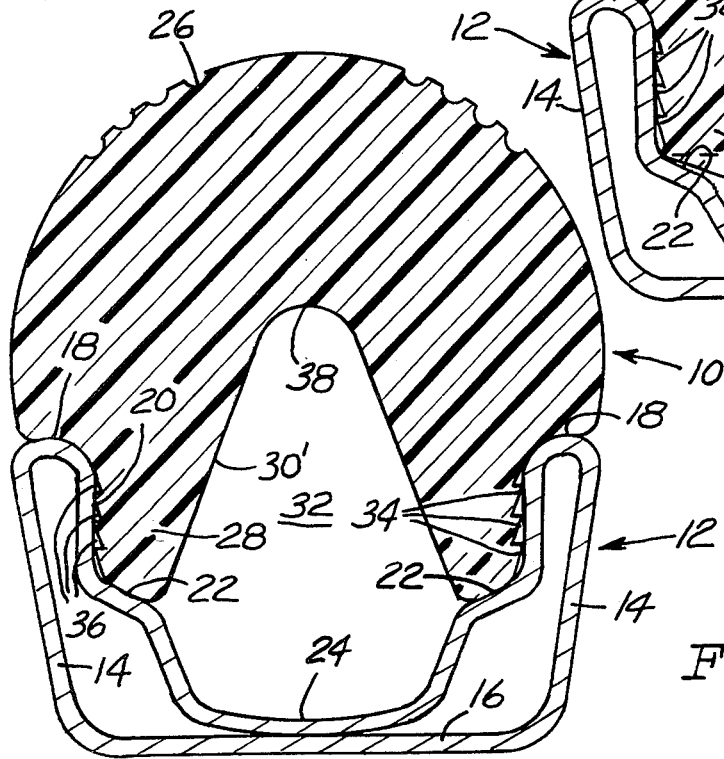
FIG. 3 is a cross-sectional view of another form of the invention.

Another modified form of the invention is shown in FIG. 3, in which it will be noted that the tunnel 30' is considerably deeper than the tunnel 30 of FIGS. 1 and 2, and the side walls of the tunnel are more or less straight, and converge upwardly to an arched center portion 38. The tunnel 30' extends farther out toward the tread 26, and therefore a lesser amount of solid urethane elastomer occupies the space between the tunnel and the treads.

As a result, the very top end of the tunnel 30' tends to collapse slightly under lesser impact loads than would be the case with the first embodiment, allowing the use of a slightly harder urethane rubber for its superior abrasion resistance and lesser rolling resistance. In all other respects, the tire of FIG. 3 is the same as the one shown in FIGS. 1 and 2.

The urethane elastomer may be made in any hardness, to give it a soft ride or to give minimum rolling resistance. Fluorescent pigments may be incorporated into the urethane for improved visibility, or it may be made in a wide variety of colors. From a production standpoint, one of the major advantages of the invention is that it requires virtually no hand lay-up, and could be made in automatic machines. It is not necessary to maintain extremely close dimensional tolerances in the tire, as the urethane tire would normally be made slightly undersized, so that it has to be stretched over the wheel rim when being mounted.

The advantages of the invention are many. Probably the most important to the bicycle owner, there is no possibility of blow-outs, flat tires, or underinflation. The tire has excellent ride quality, comparable to a high-pressure pneumatic tire, with about the same rolling resistance as the latter. Cuts may be easily repaired with silicone bathtub caulk, or other suitable adhesive, which is needed merely to hold the cut edges together to prevent the cut from propagating further. No other tire can be repaired so easily. The tire has a thick usable wear surface for extended tire wear. It can easily be removed from the wheel rim for spoke adjustment and repair, and then rebonded. The tunnel collapses uncer severe impact loads, allowing the tire to absorb the energy of a severe impact over a much wider range than would be possible with a solid tire. As a result, rim damage will be no greater than with conventional bike tires because of the cushioning effect afforded by the tunnel.

While I have shown and described in considerable detail what I believe to be the preferred form of the invention, it will be understood by those skilled in the art that the invention is not limited to such details, but might take various other forms. For example, the invention has been described in particular as a bicycle tire, but it is not limited solely to bicycle tires, as it might be used with any other tire of the same general characteristics of large diameter with small cross-sectional area. For example, tires used on wheel chairs or carts might be made in accordance with the invention. Accordingly, the term "bicycle tire" as used in the claims includes all tires of a similar character, regardless of the type of vehicle on which they are used.

What I claim is:

1. A bicycle tire for use on a wheel rim having a pair of laterally spaced bead seats, each having an outer side wall and a circumferential channel separating the bead seats, said outer side walls merging into rolled-over outer edges, said tire comprising:

a solid, monolithic tire body made of urethane elastomer, having a pair of laterally spaced bead shoulders that extend down into said wheel rim and lie against said outer side walls, said bead shoulders merging into curved surfaces that lie against said rolled-over outer edges of the rim;

the cross-sectional configuration of said tire being generally circular, with a tread on the outer periphery thereof; and a tunnel formed in the inside surface of said tire body between said bead shoulders, said tunnel being formed with outwardly converging, substantially straight sides, and extending radially outward beyond the radial dimension of the wheel rim;

said tunnel being adapted to cooperate with the channel of the wheel to form a void that allows the tire body to collapse locally under excessive impact load forces so as to cushion the blow.

* * * * *